(12) United States Patent
Agombar et al.

(10) Patent No.: US 8,799,597 B2
(45) Date of Patent: *Aug. 5, 2014

(54) DATA COPYING

(75) Inventors: John P. Agombar, Winchester (GB);
Christopher B. E. Beeken, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/874,158

(22) Filed: Sep. 1, 2010

(65) Prior Publication Data

US 2011/0055505 A1  Mar. 3, 2011

(30) Foreign Application Priority Data

Sep. 2, 2009  (EP) .................................... 09169277

(51) Int. Cl.
*G06F 12/16* (2006.01)

(52) U.S. Cl.
USPC .......................................... 711/162; 707/639

(58) Field of Classification Search
None
See application file for complete search history.

(56) References Cited

U.S. PATENT DOCUMENTS

| | | | |
|---|---|---|---|
| 6,594,744 B1 | 7/2003 | Humlicek et al. | |
| 6,981,114 B1 * | 12/2005 | Wu et al. | 711/162 |
| 8,281,093 B1 * | 10/2012 | Krishnan et al. | 711/162 |
| 2004/0158566 A1 * | 8/2004 | Chong et al. | 707/100 |
| 2005/0210193 A1 * | 9/2005 | Nagata | 711/114 |
| 2006/0200640 A1 * | 9/2006 | Agombar et al. | 711/162 |
| 2006/0230243 A1 * | 10/2006 | Cochran et al. | 711/162 |
| 2008/0256141 A1 | 10/2008 | Wayda et al. | |
| 2008/0256311 A1 | 10/2008 | Lee | |
| 2009/0037418 A1 * | 2/2009 | Xu et al. | 707/8 |
| 2010/0023716 A1 * | 1/2010 | Nemoto et al. | 711/162 |
| 2010/0088468 A1 * | 4/2010 | Agombar et al. | 711/112 |

* cited by examiner

*Primary Examiner* — Kaushikkumar Patel
(74) *Attorney, Agent, or Firm* — Griffiths & Seaton PLLC

(57) ABSTRACT

A data processing system includes a host and a plurality of locations. A difference recording operation between a first location of the plurality of locations and a second location of the plurality of locations is started. A first operational relationship between a third location of the plurality of locations and the first location is started. A signal is sent in response to the first operational relationship starting after the difference recording operation. A first dataset is updated in response to the host writing data to at least one of the first location or the second location. The first dataset is updated with changes to the first location in response to the signal.

15 Claims, 4 Drawing Sheets

DATA COPYING

CROSS-REFERENCE TO RELATED APPLICATIONS

This application claims priority to European Patent Application No. 09169277.2, filed Sep. 2, 2009, and entitled "Data Copying."

BACKGROUND

1. Field of the Invention

The present invention relates to copying data between storage devices, and more particularly to an apparatus and computer program for Point-In-Time data copying.

2. Description of the Related Art

A Point-in-Time copy (PIT) is a feature supported on various storage devices that allows a user or an automated process to make nearly instantaneous copies of entire logical volumes of data or datasets. A copy of a source storage device is made on a target storage device. The copies are immediately available for both read and write access. Typically, but not necessarily, a background copy process is also started that copies the data on the source storage device to the target storage device in portions known as grains. An example of a PIT implementation is IBM® FlashCopy® (IBM, and FlashCopy are registered trademarks of International Business Machines Corporation in the United States, other countries, or both).

Typically, a PIT may copy an entire source storage device or selected grains of the source storage device. An 'incremental PIT' copies only those grains of the source storage device that have changed since the previous PIT. Therefore, keeping track of differences in both source and target storage devices is necessary. Also typically, a full grain is copied, however alternatively, a partial grain may also be copied.

Typically, PIT operations are controlled using a PIT relationship between the source and the target storage devices. A PIT relationship map indicates differences between the source and the target storage devices. Typically, a PIT relationship map is maintained as a bitmap, comprising information about the grains, for example, whether a background copy of the grain has been completed, or whether a write has been made to the source or to the target. When a PIT is 'triggered,' the contents of the source storage device are immediately available from the target storage device.

After a PIT is triggered, but before the background copy has been completed, reads and writes are directed to the appropriate location to ensure data integrity. For example, before a host write to the source storage device, the existing data is copied to the target storage device. If a read is requested from the target storage device before the appropriate grain has been copied, the read is redirected to the corresponding grain of the source storage device. If a write is made to a grain on the target storage device, the background copy of the corresponding grain from the source storage device is not performed. If the data is found on the target storage device the grain is said to be "split." A PIT 'completes' when all contents of the source storage device are available directly from the target storage device.

In an incremental PIT, after the PIT copy is triggered, differences between the source storage device and the target storage device are recorded. In an incremental PIT only grains that are different are copied from source storage device to target storage device. During the PIT, if a host writes to the source storage device the grain is copied to the target storage device, and the grain is marked as different so that it will be recopied when the PIT is next triggered. Difference recording continues after all grains have been split and is used to reset the split bitmaps when the PIT is triggered again.

A cascaded PIT environment may also be established with target storage devices of one PIT relationship, acting as a source storage device of a further PIT relationship. In a cascaded PIT environment the contents of the source storage device of a PIT relationship may be modified by the actions of another PIT relationship using the source storage device as a target storage device. Therefore, when using incremental PIT in cascaded environments, normal difference recording cannot always record the differences accurately and has to take a pessimistic view of what data has changed when a PIT relationship is restarted.

For example, one PIT copies storage device A to storage device B (A→B), and another PIT copies storage device B to storage device C (B→C). PIT relationship A→B is triggered, followed by PIT relationship B→C. After the PITs complete, PIT relationship A→B and PIT relationship B→C continue to record differences between A and B, and between B and C respectively, ready for the next time the PITs are triggered. When A→B is re-triggered, the changes in B need to be reflected in the difference recording of B and C.

One solution is to turn off the difference recording of PIT relationship B→C, marking all of the data different. All the data is recopied when PIT relationship B→C is re-triggered. This solution is simple but reduces the effectiveness of incremental PIT within a cascaded environment.

Another solution is to analyze the bitmaps of PIT relationship A→B to determine data that should be recopied in PIT relationship B→C. This solution requires the modification of the difference bitmaps of many PIT relationships if a storage device is a source of multiple PIT relationships. In addition, the data that should be copied for PIT relationship B→C is not minimized, unless PIT relationship A→B completes. Therefore, when PIT relationship A→B is re-triggered, any data changed on source A is marked as different for PIT relationship B→C. If PIT relationship A→B is subsequently stopped before the new data is copied from A→B, the data remains marked as different in B→C even though the data on the storage devices is identical.

Therefore, there is a need in the art to address the aforementioned problem.

SUMMARY OF THE INVENTION

Viewed from a first aspect, the present invention provides a computer management apparatus for copying data in a data processing system, wherein the data processing system comprises a host and a plurality of locations, the apparatus comprising: a first operation component, operable for starting a difference recording operation between a first location of the plurality of locations and a second location of the plurality of locations; a second operation component, operable for starting a first operational relationship between a third location of the plurality of locations and the first location; a timer component, operable for sending a signal, responsive to the first operational relationship starting after the difference recording operation; an update component, operable for updating a first dataset, responsive to the host writing data to at least one of the first location or the second location; and a background component, operable for updating the first dataset with changes to the first location, responsive to the timer component sending the signal.

Advantageously, the present invention provides for accurate difference recording between two locations in a cascaded copy environment. Difference recording may continue even when changes are made to the source. Bitmap operations necessary when a copy is triggered are minimized. Exploratory recoveries using PIT reverse without affecting the difference recording capability of other incremental maps in the system.

Preferably, the present invention provides an apparatus, wherein the apparatus further comprises a third operation component, operable for starting a second operational relationship between the first location and the second location. Advantageously, the present invention provides for actual changes to a source location to be factored into a subsequent operation, instead of including potential changes as well.

Preferably, the present invention provides an apparatus, wherein the first operational relationship comprises copying data elements of the third location to the first location. Preferably, the present invention provides an apparatus, wherein the second operational relationship comprises copying data elements of the first location to the second location. Advantageously, the present invention provides for cascaded copy operations, wherein the source of one copy is the target of another copy.

Preferably, the present invention provides an apparatus, wherein the apparatus further comprises an analyze component, operable for analyzing the first dataset.

Preferably, the present invention provides an apparatus, wherein the second operational relationship is further operable for copying data elements of the first location to the second location, responsive to the analyze component determining that the first location is different from the second location. Advantageously, the present invention provides for incremental copy operations, copying only those grains of a source volume that have been changed since a previous copy, thereby reducing copy times.

Preferably, the present invention provides an apparatus, wherein each of the plurality of locations is a storage device.

Preferably, the present invention provides an apparatus, wherein the background component is further operable for analyzing a second dataset to determine changes to the first location. Preferably, the present invention provides an apparatus, wherein the second dataset comprises a plurality of binary elements. Preferably, the present invention provides an apparatus, wherein the first dataset comprises a plurality of binary elements.

Advantageously, the present invention provides for two bitmaps to be used to control copy operations. A difference bitmap records differences between two storage locations, and a split bitmap records grains that are directly available from a target location of a copy. Information from the split bitmap of one copy relationship may be used to accurately update a difference bitmap of another copy relationship.

Viewed from a second aspect, preferably, the present invention provides a method for copying data in a data processing system, wherein the data processing system comprises a host and a plurality of locations, the method comprising the steps of: starting a difference recording operation between a first location of the plurality of locations and a second location of the plurality of locations; starting a first operational relationship between a third location of the plurality of locations and the first location; sending a signal, responsive to the first operational relationship starting after the difference recording operation; updating a first dataset, responsive to the host writing data to at least one of the first location or the second location; and updating the first dataset with changes to the first location, responsive to the signal.

Preferably, the present invention provides a method, the method further comprising the step of starting a second operational relationship between the first location and the second location.

Preferably, the present invention provides a method, wherein the first operational relationship comprises copying data elements of the third location to the first location.

Preferably, the present invention provides a method, wherein the second operational relationship comprises copying data elements of the first location to the second location.

Preferably, the present invention provides a method, the method further comprising the step of analyzing the first dataset.

Preferably, the present invention provides a method, wherein the second operational relationship is further operable for copying the first location to the second location, responsive to determining that the first location is different from the second location.

Preferably, the present invention provides a method, wherein each of the plurality of locations is a storage device.

Preferably, the present invention provides a method, the method further comprising the step of analyzing a second dataset to determine changes to the first location.

Preferably, the present invention provides a method, wherein the second dataset comprises a plurality of binary elements.

Preferably, the present invention provides a method, wherein the first dataset comprises a plurality of binary elements.

Viewed from a third aspect, the present invention provides a computer program comprising computer code to, when loaded into a computer system and executed thereon, cause said computer system to perform all of the steps of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

In a preferred embodiment of the present invention, two modes of difference recording are used. A first mode records differences due to host writes to a source or target storage device in a PIT relationship. A second mode records differences due to 'split' writes when the source or target has been used as the target of a different PIT relationship started after the first PIT relationship. This means that differences are only recorded when the data on the storage devices change. There is no need to record differences in advance. Additionally, the minimum number of relationships are involved when another relationship starts.

Figure 1:
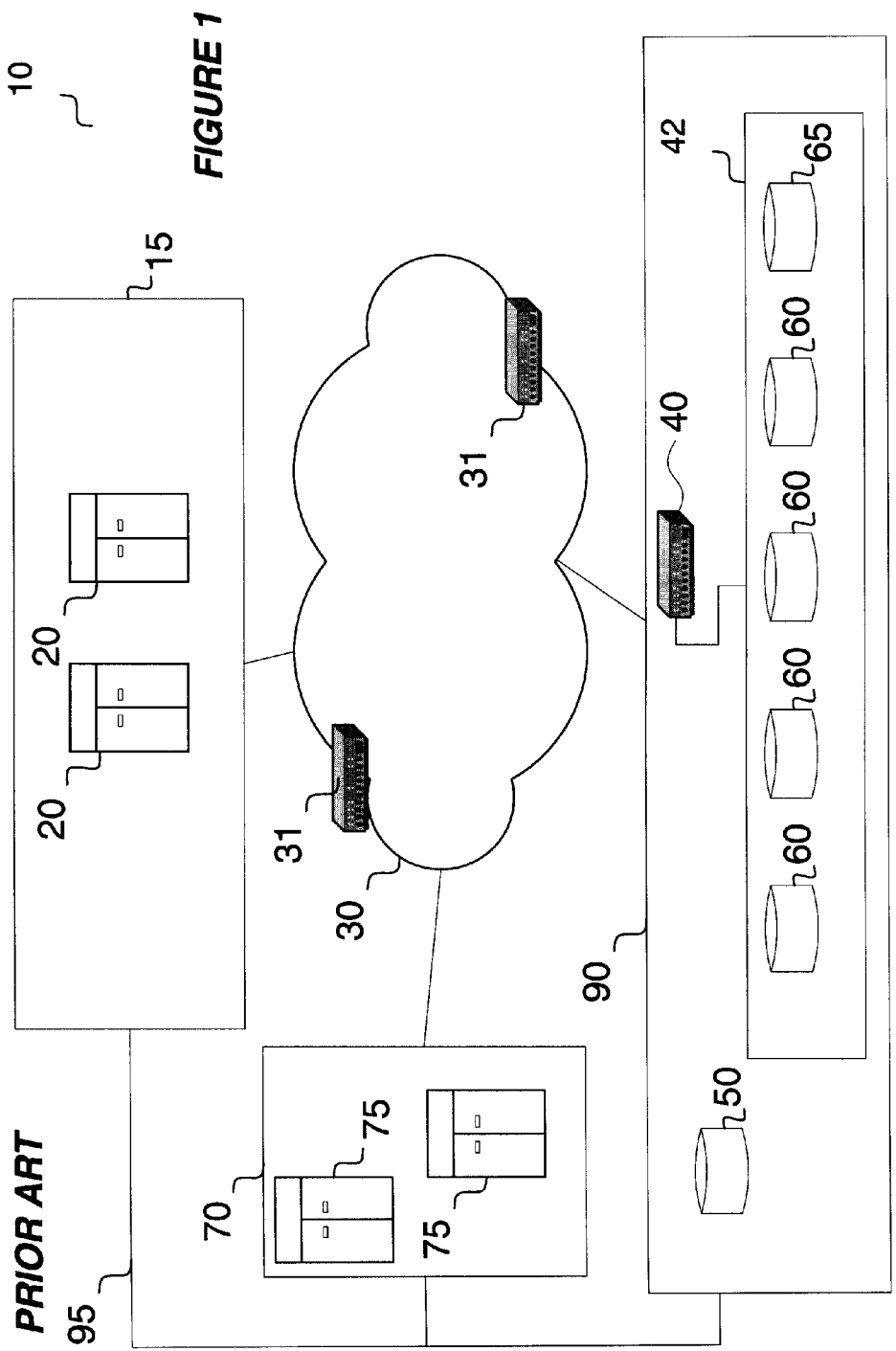
FIG. 1 is a block diagram depicting a data processing system, in accordance with the prior art, and in which a preferred embodiment of the present invention may be implemented.

FIG. 1 is a block diagram depicting a data processing system 10, in accordance with the prior art, and in which a preferred embodiment of the present invention may be implemented.

The illustrated data processing system 10 comprises a server node subsystem 15 having a set of server nodes 20, which are connectable through a network 30 to a back-end storage subsystem 90. A network 30 typically comprises network devices 31, for example switches, and cabling that connect a server node subsystem 15 to a hardware back-end storage subsystem 90. The storage subsystem 90 may comprise a variety of physical storage devices having, for example, stand-alone a Just a Bunch of Disks (JBOD) device 50, and a RAID array 42. The RAID array 42 comprises a plurality of storage devices 60, 65. A storage device 65 may be used to store a parity value associated with data stored on the other storage devices 60 in the RAID array 42. The parity storage device 65, typically, is not exclusively used to store a parity value, as in industry standard RAID implementations, parity is often rotated around the storage devices 60, 65 that comprise the RAID array 42. The storage devices 42, 50 may be presented to the server node subsystem 15 as a set of physical or logical storage volumes (not depicted). Typically the system 10 is managed by a management subsystem 70 comprising management servers 75, connectable to the server node subsystem 15, the storage subsystem 90, and the network devices 31 through the network 30 or through a separate Local Area Network (LAN) 95. Typically, a RAID Controller 40 controls the functionality of the RAID array 42, including data accesses and power controls to the individual storage devices 60, 65. Read and write commands may be sent to the storage subsystem 90 by a requester (not depicted) that may be an application program operable in the data processing system 10.

Figure 2:
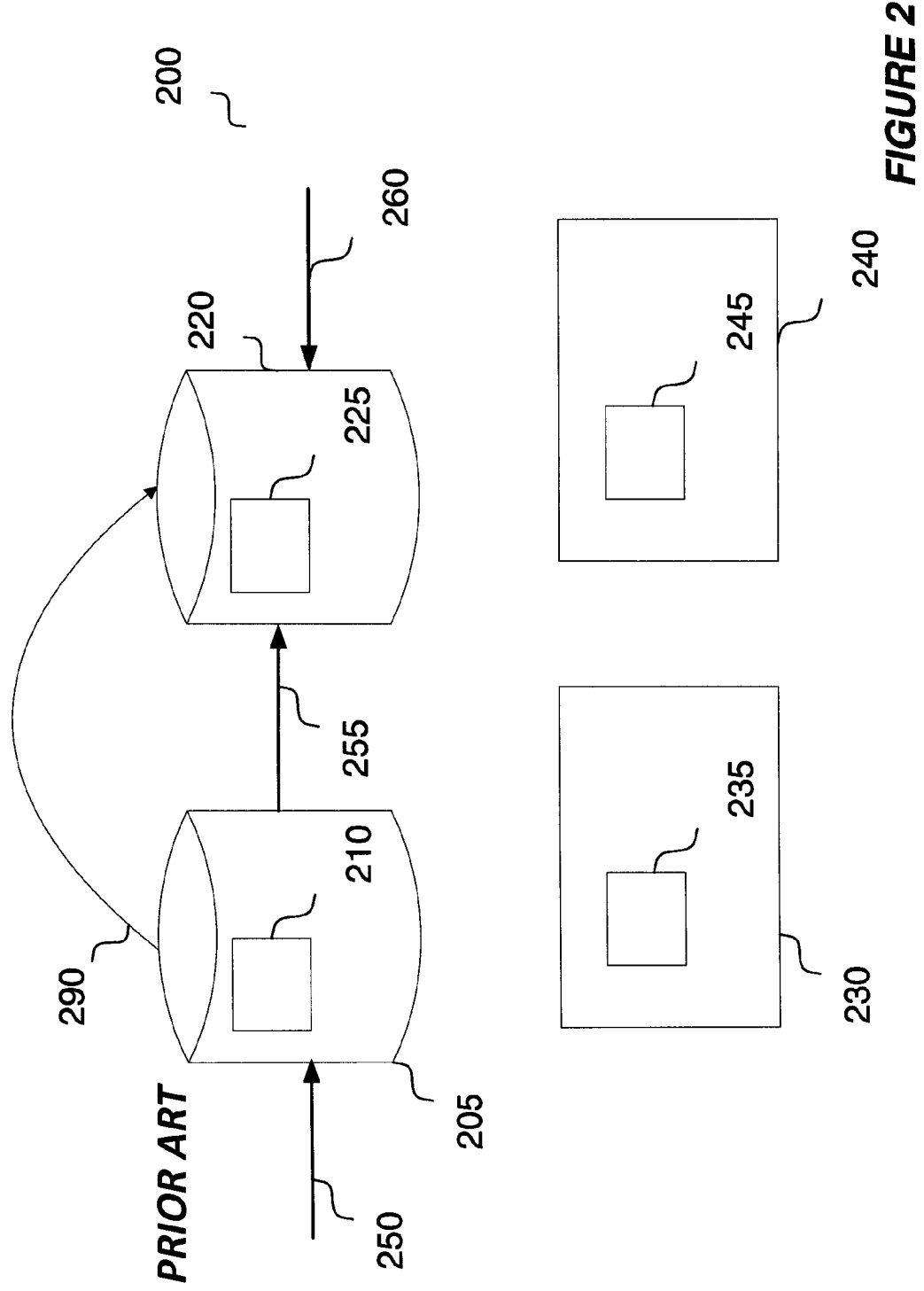
FIG. 2 is a block diagram depicting a PIT relationship 290 accordance with the prior art, and in which a preferred embodiment of the present invention may be implemented.
Figure 3:
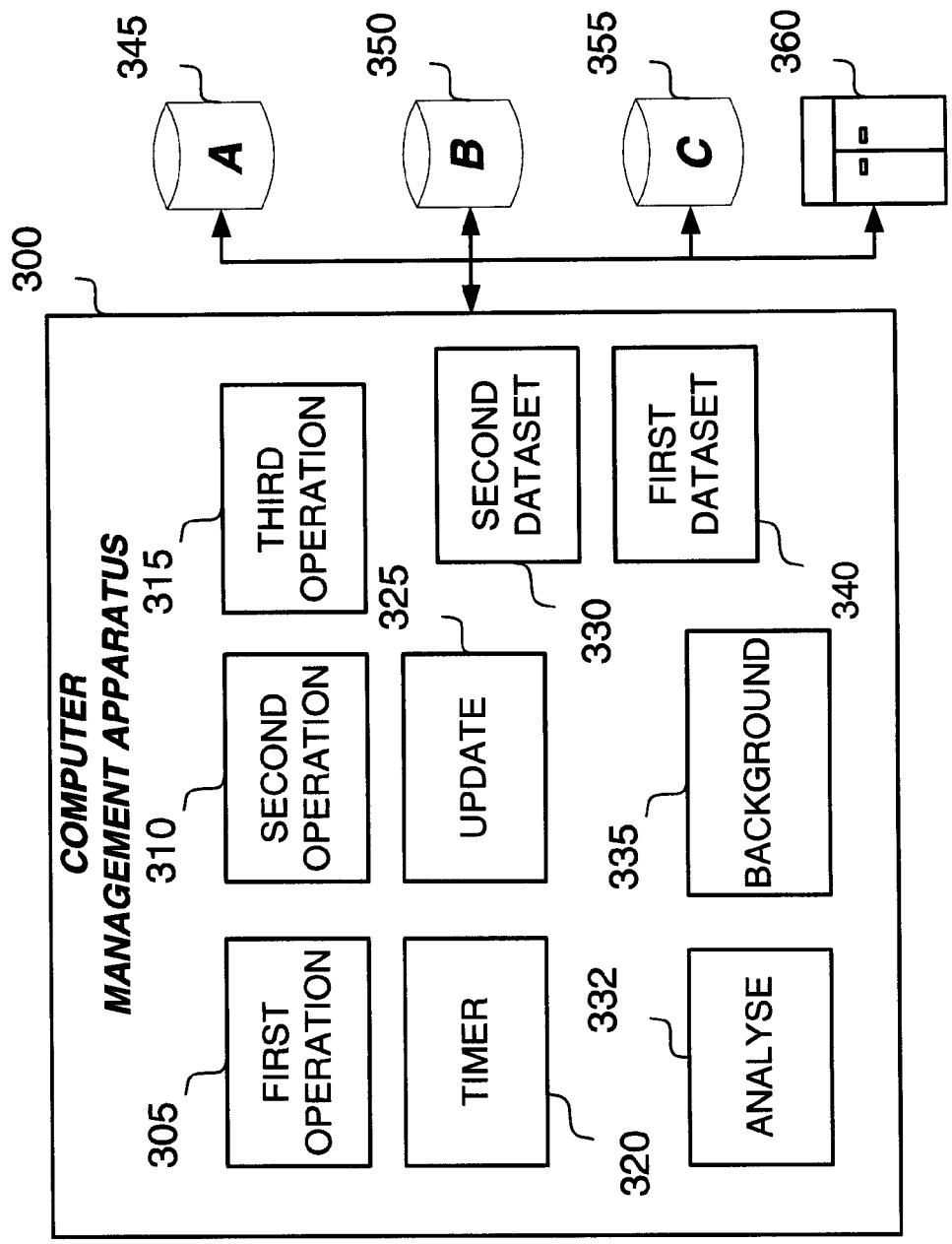
FIG. 3 is an exemplary block diagram depicting a computer management apparatus in which the present invention may be embodied.

FIG. 2, which should be read in conjunction with FIG. 3, is a block diagram 200 depicting a PIT relationship 290 in accordance with the prior art, and in which a preferred embodiment of the present invention may be implemented. FIG. 3 is an exemplary block diagram depicting a computer management apparatus in which the present invention may be embodied.

FIG. 2 depicts the PIT relationship 290 between a source storage device 205 and a target storage device 220. On the source storage device 205 a grain of data 210 is depicted. The grain of data 210 is copied to corresponding grain of data 225 on the target storage device 220.

A computer management apparatus 300 maintains a 'difference bitmap' 240, 340 and a 'split bitmap' 230, 330. The difference bitmap 240, 340 comprises a plurality of binary elements corresponding to each of the grains of the source storage device 205 and the target storage device 220. One binary element 245 is depicted, corresponding to source storage device grain 210 and target storage device grain 225. The difference bitmap 240 is used to record when the data on the source storage device 205 or the target storage device 220 has been changed since the PIT was last triggered. Data on the source storage device 205 may be changed through a host write 250. Data on the target storage device 220 may also be changed through a host write 260. Typically, a binary element 245 value of binary 1, indicates that one of the corresponding grains 210, 225 on source storage device 205 or target storage device 220 respectively, has changed since the last PIT trigger due to a host write 250, 260.

The split bitmap 230, 330 also comprises a plurality of binary elements corresponding to each of the grains of the target storage device 220. One binary element 235 is depicted, corresponding to the target storage device grain 225. When data is written to the target storage device 220 either by a background copy process 255, or by a host write 250, 260 from a host 365 to the source storage device 205 or target storage device 220, the split bitmap 230 is used to indicate that the data presented on the target storage device 220 may be found on the target storage device 220 itself. Typically, a binary element 235 value of binary 1, indicates that the data of corresponding grain 225 may be read directly from target storage device 220, rather than the read being directed to the corresponding grain 210 on source storage device 205.

Figure 4:
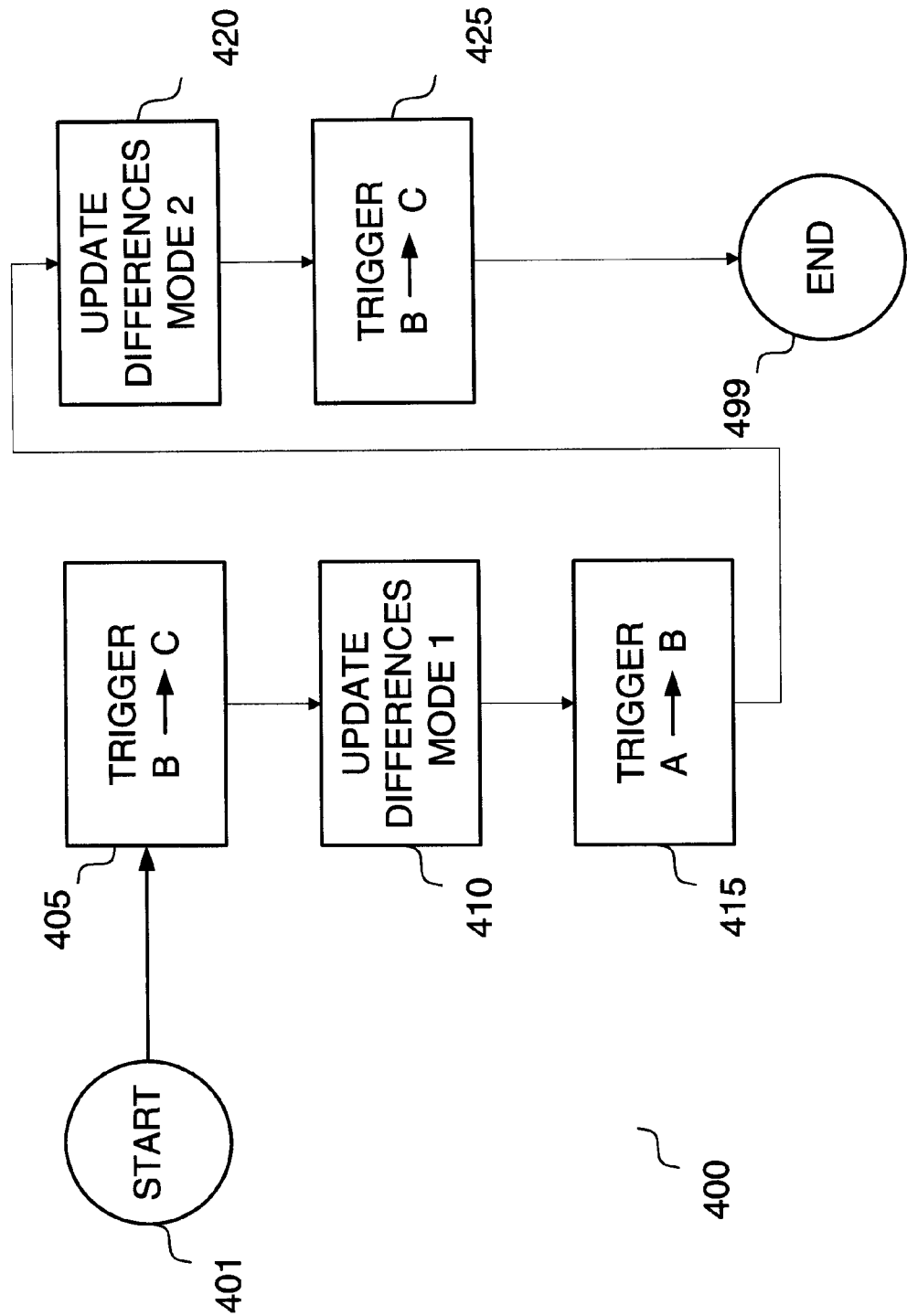
FIG. 4 is a high-level exemplary schematic flow diagram depicting typical operation method steps performed for copying data in a data processing system, in accordance with a preferred embodiment of the present invention.

FIG. 4, which should be read in conjunction with FIGS. 2 and 3, is a high-level exemplary schematic flow diagram depicting typical operation method steps performed for copying data in a data processing system, in accordance with a preferred embodiment of the present invention.

To illustrate a preferred embodiment of the invention, as an example, PIT relationship B→C 290 is established between storage device B 350 as source storage device 205, and storage device C 355 as target storage device 220. PIT relationship A→B 290 between storage device A 345 as source storage device 205, and storage device B 350 as target storage device 220 is also established.

The method starts at step 401. At step 405, a third operation component 315 triggers PIT B→C. An analyze component 332 analyzes the contents of a difference bitmap 240, 340 for PIT relationship B→C 290. Binary elements 245 of grains 210, 225 that are marked as having changed since any previous PIT B→C, are copied to the corresponding grains 225 on storage device C 355 as target storage device 220.

At step 410, a first operation component 305 starts difference recording. The difference bitmap 240, 340 for PIT relationship B→C 290 is used to record when the data on source storage device B 205, 350 or the target storage device C 220, 355 has been changed since PIT B→C was last triggered. At this stage, as PIT A→B has not triggered since the last PIT B→C trigger, a first mode of difference recording is used. An update component 325 updates the difference bitmap 240, 340 if changes are made by a host write 250 to the source storage device B 205, 350, or by a host write 260 to the target storage device C 220, 355. However, changes to storage device B 205, 350, made by a background copy process 255 from PIT relationship A→B 290 are not recorded.

At step 415, a second operation component 315 triggers PIT A→B. At step 420, the difference bitmap 240 for PIT relationship B→C 290 continues to record when the data on source storage device B 205, 350 or the target storage device C 220, 355 has been changed since PIT B→C was last triggered. A timer component 320 determines that as PIT A→B has triggered since the last PIT B→C trigger, a second mode of difference recording is to be used. The update component 325 continues to update the difference bitmap 240, 340 if changes are made by a host write 250 to the source storage device B 205, 350, or by a host write 260 to the target storage device C 220, 355. However, in the second mode, a background component 335 also updates the difference bitmap 240, 340 if changes are made to storage device B 205, 350 by a background copy process 255 from PIT relationship A→B.

At step 425, the third operation component 315 again triggers PIT B→C. The analyze component 332 again analyses the contents of the difference bitmap 240, 340 for PIT relationship B→C 290. Binary elements 245 of grains 210, 225 that are marked as having changed since any previous PIT B→C, are copied to the corresponding grains 225 on storage device C 355 as target storage device 220.

In this way the difference bitmap 240, 340 for PIT relationship B→C 290 records what has changed on storage device B 350 as source storage device 205 due to PIT relationship A→B 290. If PIT relationship B→C 290 is retriggered after the PIT A→B has completed, the normal start mechanism will ensure that only the changed data is copied to storage device C 355 as target storage device 220. If PIT A→B has not completed by the time PIT A→B is retriggered the background component 335 marks the relevant grains as different on difference bitmap 240, 340 for PIT relationship B→C 290. In an alternative embodiment, the background component 335 also analyses the split bitmap 230, 330 of PIT relationship A→B 290 in determining the relevant grains to mark as difference on difference bitmap 240, 340 for PIT relationship B→C 290. The method 700 ends at step 499.

This method defers the processing of the intended split activity of PIT relationship A→B 290, so that instead of being factored into the difference bitmap 240, 340 for PIT relationship B→C 290 at the point that PIT A→B was triggered, the differences are only factored in when the background copy 255 of a grain of PIT A→B actually happens. This method means that a PIT will only copy over the data that has actually changed since the PIT relationship 290 was last started. Bitmap operations necessary when a PIT is triggered are minimized. It will be clear to one of ordinary skill in the art that this scheme enables the user to do exploratory recoveries using PIT reverse without affecting the difference recording capability of other incremental maps in the system.

In a preferred embodiment of the invention, PIT operations are carried out using full grain writes. In an alternative embodiment of the invention, partial grain writes may also made.

FIG. 4 is set forth as a logical flow chart diagram. As such, the depicted order and labeled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A computer management apparatus for copying data in a data processing system, wherein the data processing system comprises a host and a plurality of locations, the apparatus comprising a plurality of non-transitory components, including:
a first operation component, operable for starting a difference recording operation between a first location of the plurality of locations and a second location of the plurality of locations;
a second operation component, operable for starting a first operational relationship between a third location of the plurality of locations and the first location;
a timer component, operable for sending a signal, responsive to the first operational relationship starting after the difference recording operation;
an update component, operable for updating a first dataset, responsive to the host writing data to at least one of the first location or the second location; and
a background component, operable for updating the first dataset with changes to the first location, responsive to the timer component sending the signal.

2. The apparatus of claim 1, wherein the apparatus further comprises a third operation component, operable for starting a second operational relationship between the first location and the second location.

3. The apparatus of claim 1, wherein the first operational relationship comprises copying data elements of the third location to the first location.

4. The apparatus of claim 2, wherein the second operational relationship comprises copying data elements of the first location to the second location.

5. The apparatus of claim 1, wherein the apparatus further comprises an analyze component, operable for analyzing the first dataset.

6. The apparatus of claim 5, wherein the second operational relationship is further operable for copying data elements of the first location to the second location, responsive to the analyze component determining that the first location is different from the second location.

7. The apparatus of claim 1, wherein each of the plurality of locations is a storage device.

8. The apparatus of claim 1, wherein the background component is further operable for analyzing a second dataset to determine changes to the first location.

9. The apparatus of claim 8, wherein the second dataset comprises a plurality of binary elements.

10. The apparatus of claim 1, wherein the first dataset comprises a plurality of binary elements.

11. A computer program product for locating a computer-controlled entity using a processor device, the computer program product comprising a computer-readable storage medium having non-transitory computer-readable program code portions stored therein, the computer-readable program code portions comprising:

a first executable portion for starting a difference recording operation between a first location of the plurality of locations and a second location of the plurality of locations;

a second executable portion for starting a first operational relationship between a third location of the plurality of locations and the first location;

a third executable portion for sending a signal, responsive to the first operational relationship starting after the difference recording operation;

a fourth executable portion for updating a first dataset, responsive to the host writing data to at least one of the first location or the second location; and a fifth executable portion for updating the first dataset with changes to the first location, responsive to the signal.

12. The computer program product of claim 11, further including a sixth executable portion for starting a second operational relationship between the first location and the second location.

13. The computer program product of claim 12, wherein the first operational relationship includes copying data elements of the third location to the first location.

14. The computer program product of claim 12, wherein the second operational relationship includes copying data elements of the first location to the second location.

15. The computer program product of claim 11, further including a seventh executable portion for analyzing the first dataset.

* * * * *